United States Patent [19]
Mehlhorn

[11] Patent Number: 5,883,485
[45] Date of Patent: Mar. 16, 1999

[54] SIMPLIFIED CONTROL FOR RUNNING A SWITCHED RELUCTANCE MOTOR

[75] Inventor: William L. Mehlhorn, Greenfield, Wis.

[73] Assignee: A. O. Smith Corporation, Milwaukee, Wis.

[21] Appl. No.: 840,727

[22] Filed: Mar. 26, 1997

[51] Int. Cl.⁶ .................................................. H02P 1/46
[52] U.S. Cl. ........................... 318/701; 318/254; 318/138
[58] Field of Search .................................... 318/701, 254, 318/138

[56] References Cited

U.S. PATENT DOCUMENTS

| | | | |
|---|---|---|---|
| 4,074,179 | 2/1978 | Kuo et al. | 318/696 |
| 4,743,815 | 5/1988 | Gee et al. | 318/254 |
| 5,446,359 | 8/1995 | Horst | 318/701 |
| 5,463,299 | 10/1995 | Futami et al. | 316/618 |

FOREIGN PATENT DOCUMENTS

| | | | |
|---|---|---|---|
| 2 274 361 A | 7/1994 | United Kingdom | H02P 7/00 |
| WO 88/02952 | 4/1988 | WIPO | H02P 6/02 |

Primary Examiner—William M. Shoop, Jr.
Assistant Examiner—Rita Leykin
Attorney, Agent, or Firm—Michael Best & Friedrich LLP

[57] ABSTRACT

A control circuit for controlling a switch reluctance motor including at least one phase, the control comprising a power stage including means for variably supplying a DC voltage, and a winding stage including for each phase a phase winding having one end and another end. The winding stage further includes a high voltage bus connected to the power stage, and a low voltage bus connected to the power stage. The winding stage further includes, for each phase, a first current path comprising an upper commutating switch connected to the high voltage bus, the respective phase winding one end connected to the upper switch, and a lower commutating switch connected to the respective phase winding other end and to the low voltage bus. The winding stage also includes, for each phase, a second current path comprising a first unidirectional current flow device connected to the low voltage bus and to between the upper switch and the respective phase winding one end, and a second unidirectional current flow device connected to between the respective phase winding other end and the lower switch and connected to the high voltage bus.

15 Claims, 3 Drawing Sheets

ROTOR POSITION

5,883,485

SIMPLIFIED CONTROL FOR RUNNING A SWITCHED RELUCTANCE MOTOR

BACKGROUND OF THE INVENTION

The invention relates to switched reluctance "SR" Motors and, more particularly, to simplified methods of controlling the speed of switched reluctance motors and for determining which phase of an SR motor to commutate at a given moment.

Switched reluctance motors have multiple poles on both the stator and the rotor. There are windings or coils on the stator poles, and each pair of windings on diametrically opposite stator poles is connected in series to form an electrically independent phase of the SR motor. There are no windings or magnets on the rotor. However, the rotor is made of a magnetically permeable material such as, for example, a ferrous alloy.

SUMMARY OF THE INVENTION

This invention provides a control circuit for a switched reluctance motor comprising at least one phase, each phase including a phase winding having one end and another end, the control circuit comprising a power stage and a winding stage, the winding stage including a high voltage bus connected to the power stage, and a low voltage bus connected to the power stage. The winding stage further includes, for each phase, a first current path comprising an upper commutating switch connected to the high voltage bus, the respective phase winding one end connected to the upper switch, and a lower commutating switch connected to the respective phase winding other end and to the low voltage bus. The winding stage further includes, for each phase, a second current path comprising a first unidirectional current flow device connected to the low voltage bus and to between the upper switch and the respective phase winding one end, and a second unidirectional current flow device connected to between the respective phase winding other end and the lower switch and connected to the high voltage bus.

In one embodiment, the winding stage further includes means for commutating each of the phase windings, the commutating means including current sensing means for measuring the magnitude of only forward going current in each of the phase windings. And there are three phases, and the current sensing means comprises a single current sensor which senses current in all three of the phase windings. The one current sensor is in the low voltage bus first branch between the power stage and all of the first current paths.

The invention also provides a control circuit for controlling a switch reluctance motor including at least one phase, the control comprising a winding stage including for each phase a phase winding and means for commutating the winding, and a power stage comprising means for variably supplying a DC voltage to the winding stage.

In one embodiment, the winding stage further includes a high voltage bus and a low voltage bus and the variable voltage means comprises a first unidirectional current flow device connected to the high voltage bus, and a second unidirectional current flow device connected to the first current flow device and to the low voltage bus, the node between the first and the second current flow devices being adapted to be connected to an alternating current source. The power stage also includes means for variably controlling when the first and second unidirectional current flow devices permit current flow.

The principal advantage of the invention is the provision of a simplified control for driving a switched reluctance motor at low, medium and high speeds using a single control approach.

Another advantage of the invention is a low-cost control which uses a single current sensor for providing current detection for all phases of a multi-phase SR motor.

Another advantage of the invention is the provision of a control for an SR motor which reduces noise, and which permits better power control, thereby reducing power flow back to the DC bus, either reducing the size needed for the bus capacitor, or improving the capacitor's life.

Another advantage of the invention is the provision of a control which reduces the need to turn on and off high current switches. This reduces switch power losses, raising system efficiency and lowering system cost because cheaper switches can be used. This also helps reduce voltage transitions which affect the life of the motor insulation.

Other features and advantages of the invention will become apparent to those skilled in the art upon review of the following detailed description, claims and drawings.

DESCRIPTION OF THE DRAWINGS

As illustrated in FIG. 2, the SCR can be turned on so only the last 30% of the positive portion of the AC voltage is used to power the DC bus. FIG. 3 illustrates turning the SCR on so that only 45 degrees of the AC voltage is used. FIG. 4 illustrates turning the SCR on so that 90 degrees of the AC voltage is used, thereby generating the highest amount of DC voltage.

Figure 1:
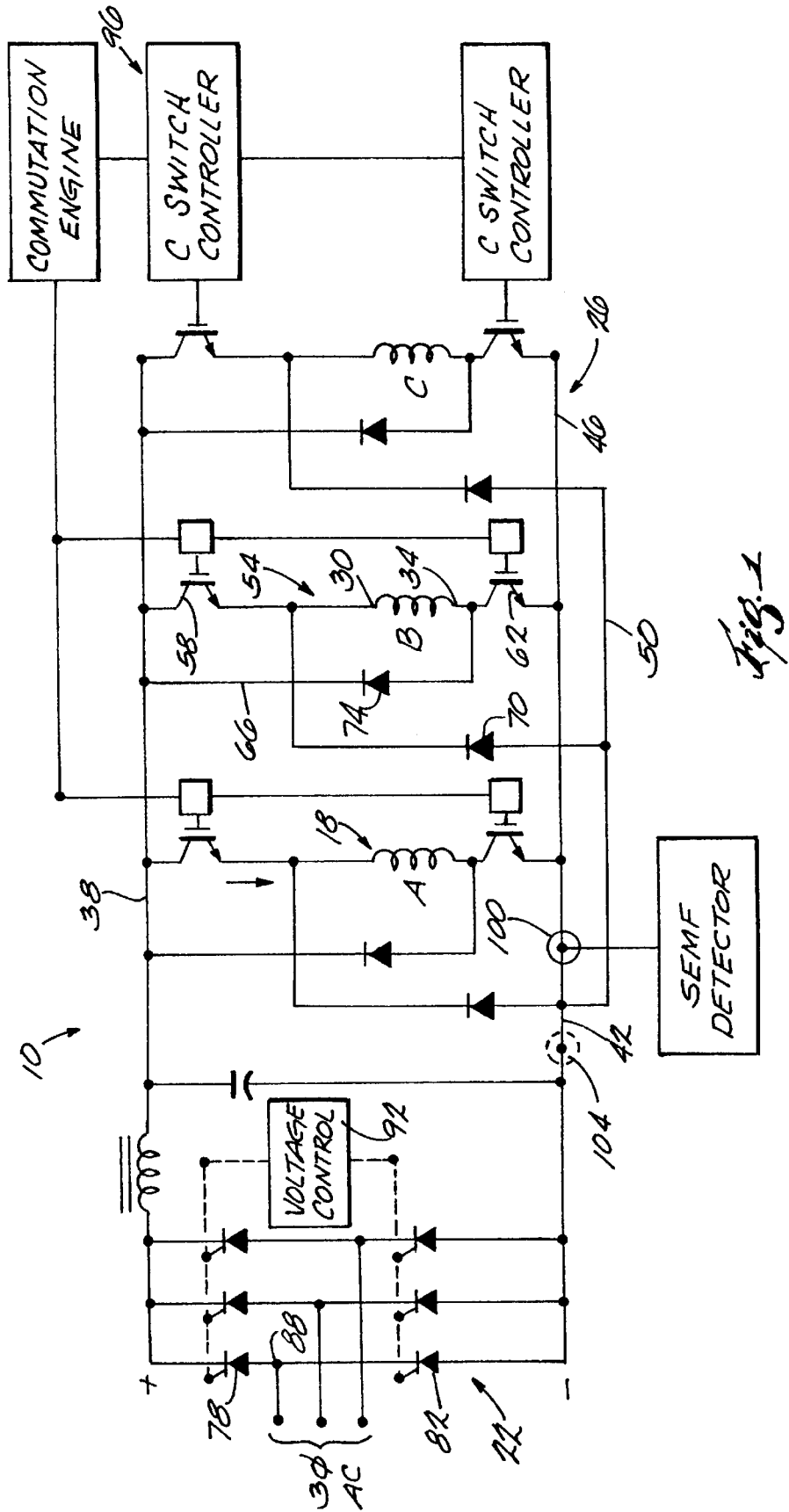
FIG. 1 is a schematic diagram of the electronic circuit for supplying voltage to the SR motor windings and for commutating the winding phases. The diagram includes silicon controlled rectifiers (SCRs) in the AC to DC power stage of the control.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Figure 8:
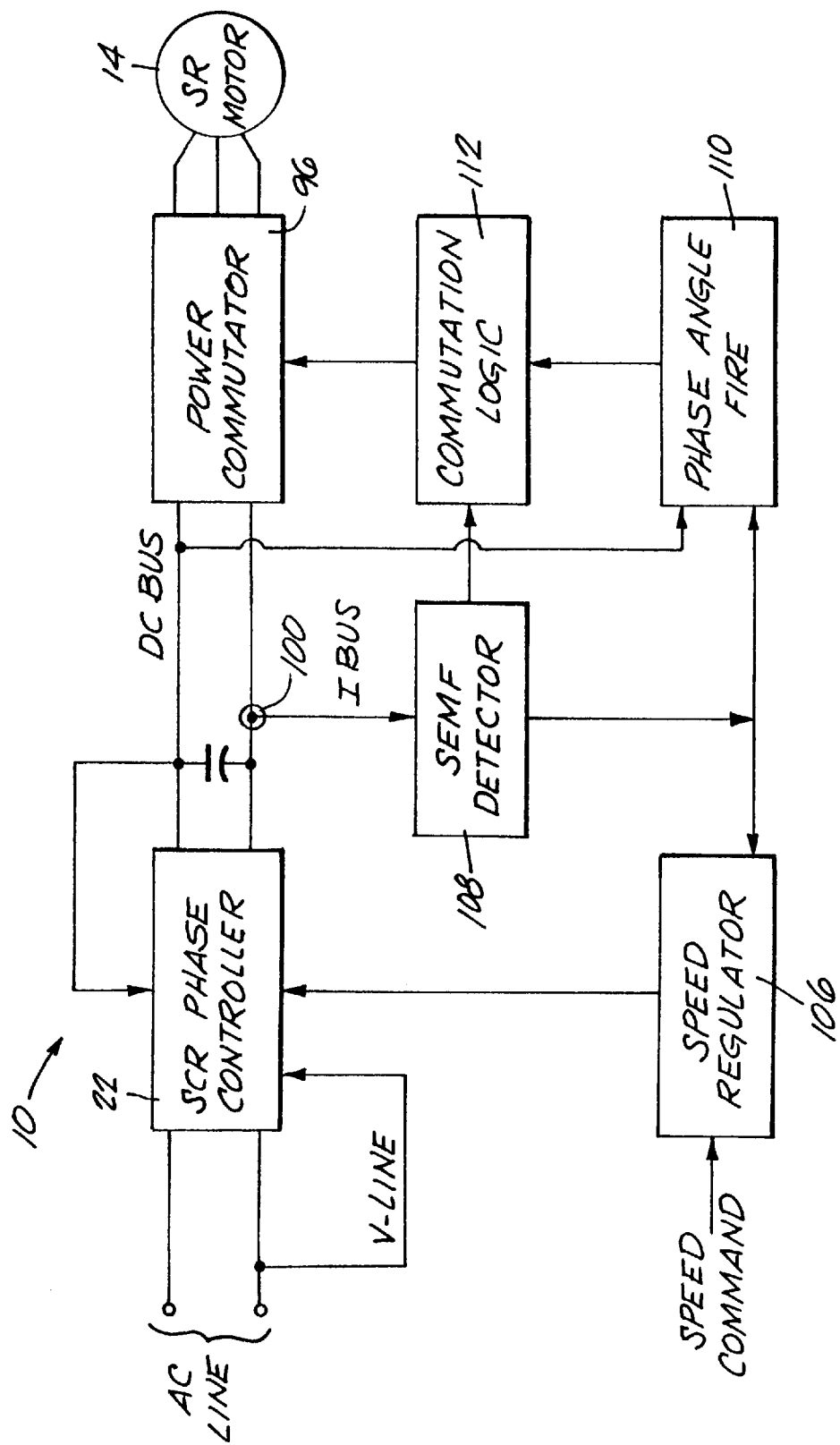
FIG. 8 is a schematic diagram of the overall circuit for controlling the switch reluctance motor which is the subject of this invention.

As illustrated in FIGS. 1 and 8, this invention is a control circuit 10 for controlling a switch reluctance motor 14 including at least one phase 18, the control 10 comprising a power stage 22 including means for supplying a variable DC voltage, and a winding stage 26 including for each phase a phase winding having one end 30 and another end 34. The winding stage 26 further includes a high voltage bus 38 connected to the power stage 22, a low voltage bus 42 including a first branch 46 connected to the power stage 22, and a second branch 50 separate from the first branch 46 and connected to the power stage 22. The winding stage 26 further includes, for each phase, a first current path 54 comprising an upper commutating switch 58 connected to the high voltage bus 38, the respective phase winding one end 30 connected to the upper switch 58, and a lower commutating switch 62 connected to the respective phase winding other end 34 and to the low voltage bus first branch 46. The winding stage 26 also includes a second current path 66 comprising a first unidirectional current flow device or diode 70 connected to the low voltage bus second branch 50 and to between the upper switch 58 and the respective phase winding one end 30, and a second unidirectional current flow device or diode 74 connected to between the respective phase winding other end 34 and the lower switch 62 and connected to the high voltage bus 38.

More particularly, the variable voltage means comprises a first unidirectional current flow device or SCR 82 connected to the high voltage bus 38, and a second unidirectional current flow device or SCR 82 connected to the first current flow device 78 and to the low voltage bus 42, the connection point or node 88 between the first and the second current flow devices being adapted to be connected to an alternating current source, and means 92 for variably controlling when the first and second unidirectional current flow devices permit current flow. More particularly, there are three groups of the first and the second current flow devices, with each having the respective node adapted to be connected to a different phase of an alternating current source.

The winding stage 26 also includes, as illustrated in FIGS. 1 and 8, means 96 for commutating each of the phase windings, the commutating means including current sensing means for measuring the magnitude of only forward going current in each of the phase windings. More particularly, there are three phases, and the current sensing means comprises a single current sensor 100 which senses current in all three of the phase windings. The one current sensor 100 is in the low voltage bus first branch 46 between the power stage 22 and all of the first current paths 54.

Figure 6:
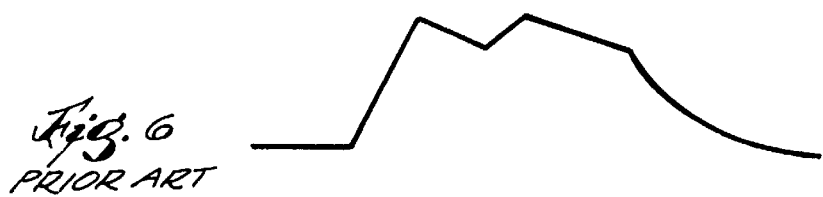
FIG. 6 is an illustration similar to FIG. 5 only showing the current wave form as a function of rotor position when using the prior art current control method.

In the past the motor phase currents of an SR motor have been controlled by chopping the voltage wave form applied to the windings. To determine what the chopping pattern should be, one of two methods was used. In one method, chopping was based upon current control or chopping to control the average voltage applied to the winding. As illustrated in FIG. 1 and by referring to, for example, phase A, one can see that upper 58 and lower 62 power switches such as an IGBT, have been used to control current flowing through the winding. In the prior art current control method, the current flowing through the winding as a function of rotor position is illustrated in FIG. 6. The peak and valley form of the current magnitude with respect to rotor position resulted from use of this current control method. During an initial time interval, both control switches are on and the phase current increases until it reaches an upper current limit. At that time, the upper switch 58 is turned off. The current now circulates through the phase winding until the current drops down to a new lower current limit, at which time the upper switch 58 is again turned on. This process is repeated until a time interval sufficient to create the desired average current has been reached, at which time both switches are turned off, at which point the phase winding current is steered back to the supply bus.

Figure 7:
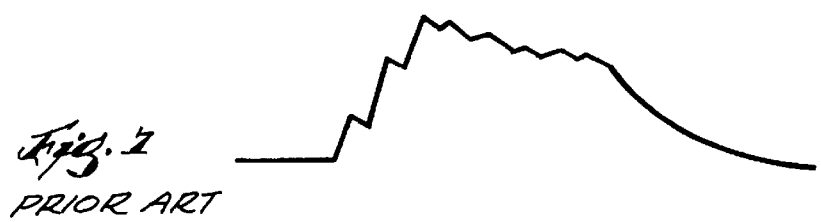
FIG. 7 is a graphical illustration similar to FIG. 5 only illustrating the current wave form as a function of rotor position when using the prior art voltage control method.

In another prior art method, called the average voltage control method, a current magnitude versus rotor position curve is produced such as that illustrated in FIG. 7. In this method, the upper switch 58 is again turned on and off. The amount of off time determines the average voltage applied to the windings. If a high voltage is desired, the upper switch 58 is mostly on. If a low voltage is desired, the upper switch 58 is mostly off. The current that flows as a result of turning the upper switch on and off is a complex interaction of bus voltage, motor winding inductance, and motor self-induced back voltage. Ultimately, after a time interval has passed, both switches are turned off and the phase winding current is again returned to the DC supply bus. In both of the above methods, when both switches are on, the full DC supply voltage is used to push the phase winding current around the circuit.

Figure 5:
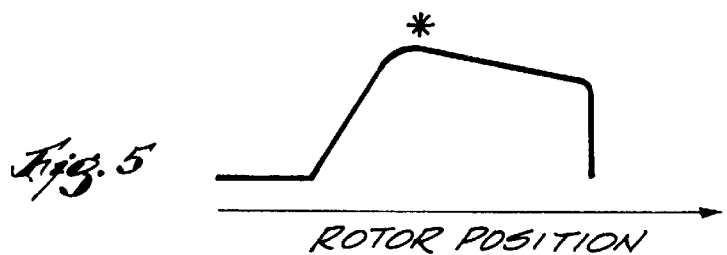
FIG. 5 is a graphical illustration of the amount of current flowing through a phase winding as a function of rotor position when using the motor control of this invention.

According to one aspect of this invention, a new method of controlling the switched reluctance motor is used. In this new method, the average voltage applied to the phase windings is determined not by the on/off switches used to control the current flowing through the phase windings, but instead is controlled by the SCRs 78 and 82 in the power stage 22 of the circuit 10. The switches for controlling current flowing through the phase windings thus need only be used as commutation switches. The current that flows through these switches is dependent upon the desired motor torque. Further, as a result of this approach, a smoother current magnitude curve is produced, as illustrated in FIG. 5.

Unlike in the prior art approaches, the full DC supply voltage is applied to the windings only when a maximum motor torque is required. This results in a smooth current wave form, with a minimum number of distortions, as illustrated in FIG. 5. As a result of using this approach, the motor current wave form is smooth and regular enough that self-induced back electromotive force (SEMF) can be used for rotor position deduction. This wave form detection approach thus will work well across most of the speed range of the motor. Further, as a result of not having to apply the full DC supply voltage to the phase winding in order to control voltage, the motor is noticeably quieter and smoother sounding. Power losses due to the turning on and off of the commutation switches are also minimized. This raises system efficiency and lowers cost because cheaper switches can now be used. The decrease in applied voltage at lower motor speeds further improves motor insulation life by reducing the number of pulse dv/dt transitions.

An appropriate sensorless SEMF rotor position technique which can be used in this invention is disclosed in Kuo et al. U.S. Pat. No. 4,074,179, which is incorporated herein by reference. As explained in this reference, the change in current magnitude is monitored until the incremental change in current magnitude changes direction from a positive increase to a negative increase at a maximum current magnitude. This reaching of this maximum current magnitude is related to rotor position and can then be used in order to determine when to switch the commutation from one phase to another.

In prior art constructions, this approach was only used at higher rotor speeds because at lower rotor speeds, chopping to control the voltage applied to the windings produced an irregular curve which could not be used for slope detection. As a result of the DC voltage control of this invention, however, by controlling the level of voltage applied to the commutation switches, a smooth current magnitude curve is produced and a SEMF technique can be used for determining rotor position over most of the speed range of the motor.

Voltage control within the power stage 22 or rectifier portion of the control circuit 10 is done as follows. In the prior art, diodes were used for converting the positive portion of the alternating current to produce a positive DC voltage. This was accomplished by using diodes which permitted current to flow from the AC voltage through the winding in only one direction. The capacitor in parallel with the diodes was used for smoothing the current supplied by the alternating current. This resulted in a DC current out of the rectifier.

Figure 2:
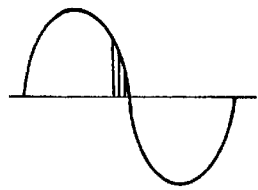
FIGS. 2, 3 and 4 illustrate the AC voltage as applied to the SCRs shown in FIG. 1. By controlling where in the AC voltage cycle the SCR is turned on, the amount of DC voltage generated by the AC voltage can be controlled.
Figure 3:
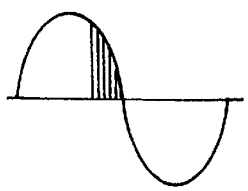
Figure 4:
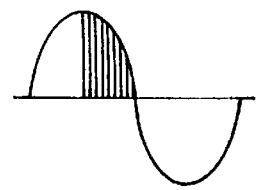

In the control circuit 10 of this invention, the diodes of the rectifier are replaced with silicon controlled rectifiers (SCRs). By using an SCR control to turn on the SCR which is dependent upon the desired motor speed and the phase of the alternating current, the SCR can be used to switch on the SCR only during a portion of the alternating current cycle. This results in the production of a variable DC voltage output from the rectifier. As illustrated in FIG. 2, the SCRs can be switched on so that only 30° of the positive 180° cycle of the AC voltage is used. This will produce a smaller voltage out of the rectifier than in the case of FIG. 3, for example, where the SCRs are turned on for the last 45° of the positive AC wave. In FIG. 4, a maximum voltage is produced by turning on the SCRs for 90° of the positive current wave. In other less preferred embodiments, other devices could be used, such as a triac, an IGBT switch, a bipolar transistor or a MOSFET. In another less preferred embodiment, an AC to DC buck converter can be used, especially for smaller motors.

According to another aspect of the invention, a better current wave form for use in SEMF detection results from the location of the current sensor in the control circuit. In the prior art, a separate current sensor was provided for each phase of a multi-phase motor. Each of these current sensors thus detected not only the current magnitude during the energizing of the winding, but it also measured the free-wheeling current present passing through the phase after energizing of the winding. At higher speeds, the presence of the freewheeling current in the unenergized phases prevented the use of a single current sensor from being able to detect the energizing of the next phase accurately enough in order to use the current magnitude for rotor position.

In other prior art controls, a single current sensor 104 was used. This prior art current sensor 104 is shown for illustration purposes only in ghost in FIG. 1, and is not a part of the control circuit 10 of the invention. However, the single current sensor of the prior art detected all current flowing through the windings. For the reasons just mentioned, this prevented the use of a single current sensor from being able to detect current in all three phases at higher rotor speeds. As illustrated in FIG. 7, even after both commutation switches were turned off, freewheeling current present in the phase winding prevented the current from going to zero early enough in order to permit SEMF detection in the next rotor phase. As a result of the novel location of the current sensor 100 of this invention, however, the current being detected by the current sensor goes to zero at the time both switches 58 and 62 are turned off. This permits the current sensor to detect the current flowing into the next energized phase immediately, permitting better current magnitude detection and better rotor position determination across a wider speed range.

The overall circuit 10 is illustrated schematically in FIG. 8, where the 3 phase AC line provides the voltage input to the circuit 10. The AC line is then rectified by the SCR phase controller 22 in order to produce a DC bus. The voltage level of the DC bus, the voltage of the AC input source and the desired speed from a speed regulator 106 determine when the SCRs should be turned on, as explained above. The current sensor 100 in the lower DC voltage bus 42, as more particularly illustrated in FIG. 1, is used for current magnitude detection. This current magnitude detected is provided to a SEMF detector 108, which in turn is used as an indication of rotor position. This indication of rotor position, as well as the desired speed, are used to determine when to commutate one phase and energize a second phase, as is conventional in the prior art. The phase angle 110 and commutation logic 112, as is conventional in prior art, are then used to turn on and off the commutation switches 58 and 62.

Various features of the invention are set forth in the following claims.

I claim:

1. A control circuit for a switched reluctance motor comprising at least three phases, each phase including a phase winding having one end and another end, the control circuit comprising a power stage and a winding stage, the winding stage including:

a high voltage bus connected to the power stage, a low voltage bus connected to the power stage, said low voltage bus including a first branch circuit and a second branch circuit; and, for each phase, a first current path from the high voltage bus to the low voltage bus comprising an upper commutating switch connected to the high voltage bus, said respective phase winding one end connected to said upper switch, and a lower commutating switch connected to said respective phase winding other end and to said low voltage bus, a second current path from said second branch circuit of said low voltage bus to the high voltage bus, said second current path including a first unidirectional current flow device connected to said second branch circuit of said low voltage bus, and to said first current path between said upper switch and said respective phase winding one end, and a second unidirectional current flow device connected to said first current path between said respective phase winding other end and said lower switch and connected to said high voltage bus; and a current sensor located in said low voltage bus between said first current path and said second current path to sense current in all three of said phase windings.

2. A control circuit as defined in claim 1 wherein the winding stage further includes means for commutating each of said phase windings, and wherein said current sensor measures the magnitude of only current going from the high voltage bus to the low voltage bus in each of said phase windings.

3. A control circuit for controlling a switched reluctance motor including at least three phases, said control circuit comprising a power stage including means for supplying a variable DC voltage, and a winding stage including for each phase a phase winding having one end and another end, said winding stage further comprising:

a high voltage bus connected to the power stage, a low voltage bus connected to the power stage, said low voltage bus including a first branch circuit and a second branch circuit, a first current path from the high voltage bus to the low voltage bus comprising an upper commutating switch connected to the high voltage bus, said respective phase winding one end connected to said upper switch, and a lower commutating switch connected to said respective phase winding other end and to said low voltage bus, a second current path from said second branch circuit of said low voltage bus to the high voltage bus, said second current path including a first unidirectional current flow device connected to said second branch circuit of said low voltage bus, and to said first current path between said upper switch and said respective phase winding one end, and a second unidirectional current flow device connected to said first current path between said respective phase winding other end and said lower switch and connected to said high voltage bus, and current sensing means for measuring the magnitude of only current going from the high voltage bus to the low voltage bus in each of said phase windings.

4. A control circuit as defined in claim 3 wherein said variable voltage means comprises a first unidirectional current flow device connected to said high voltage bus, and a second unidirectional current flow device connected to said first current flow device and to said low voltage bus, the node between said first and said second current flow devices being adapted to be connected to an alternating current source, and means for variably controlling when said first and second unidirectional current flow devices permit current flow.

5. A control circuit as defined in claim 4 wherein there are three groups of said first and said second current flow devices, with each having said respective node adapted to be connected to a different phase of an alternating current source.

6. A control circuit as defined in claim 3 wherein the winding stage further includes means for commutating each of said phase windings.

7. A control circuit as defined in claim 6 wherein said current sensing means comprises a current sensor which senses current in all three of said phase windings.

8. A control circuit as defined in claim 7 wherein said current sensor is located in said low voltage bus between said first current path and said second current path.

9. A control circuit for a switched reluctance motor comprising at least one phase, said phase including a phase winding having one end and another end, the control circuit comprising a power stage and a winding stage, the winding stage including:

a high voltage bus connected to the power stage, a low voltage bus connected to the power stage, said low voltage bus including a first branch circuit and a second branch circuit, a first current path comprising an upper commutating switch connected to the high voltage bus, said respective phase winding one end connected to said upper switch, and a lower commutating switch connected to said respective phase winding other end and to said low voltage bus, a second current path comprising a first unidirectional current flow device connected to said second branch circuit of said low voltage bus and to said first current path between said upper switch and said respective phase winding one end, and a second unidirectional current flow device connected to said first current path between said respective phase winding other end and said lower switch and connected to said high voltage bus, and means for commutating each of said phase windings, said commutating means including current sensing means for measuring the magnitude of only current going from the high voltage bus to the low voltage bus in said phase winding, said current sensing means comprising a current sensor located in said low voltage bus between said first current path and said second current path.

10. A method of controlling a switched reluctance motor having at least one phase including a phase winding having one end and another end, the method comprising:

providing a first voltage bus;

providing a second voltage bus, said second voltage bus including a first branch circuit and a second branch circuit;

providing a first current path from the first voltage bus to the second voltage bus, the first current path including an upper commutating switch connected to the first voltage bus and to the phase winding one end, and a lower commutating switch connected to the phase winding other end and to the second voltage bus;

providing a second current path from said second branch of said second voltage bus to the first voltage bus, the second current path including a first unidirectional current flow device connected to said second branch of said second voltage bus and to the phase winding one end between said upper switch and said phase winding, and a second unidirectional current flow device connected to said phase winding other end between said phase winding and said lower commutating switch, and said second separate current path being connected to said first voltage bus; and measuring current flow in said phase between said first current path and said second current path.

11. A method as set forth in claim 10 and further comprising commutating said phase winding to generate torque in said motor.

12. A method as set forth in claim 10 wherein said act of measuring the magnitude of current in said phase winding includes measuring the magnitude of only current flowing from said first voltage bus to said second voltage bus in said phase.

13. A control circuit for a switched reluctance motor having at least one phase winding, said control circuit comprising:

a power stage for supplying electrical energy;

a first voltage bus connected to said power stage;

a second voltage bus connected to said power stage, said second voltage bus including a first branch and a second branch connected to said first branch at a first node, and the phase winding being connected between said first voltage bus and said first branch of said second voltage bus at a second node; and a current sensor electrically connected to said first branch between said first node and said second node for measuring current flow in the phase winding.

14. A control circuit as set forth in claim 13 wherein the phase winding includes a first end and a second end, and wherein said control circuit further comprises a first unidirectional current flow device connected between said second end and said first voltage bus, and a second unidirectional current flow device connected between said first end and said second branch of said second voltage bus.

15. A control circuit as set forth in claim 13 and further comprising means for commutating the phase winding.

* * * * *